United States Patent [19]

Willenz et al.

[11] Patent Number: 5,999,981
[45] Date of Patent: Dec. 7, 1999

[54] SWITCHING ETHERNET CONTROLLER PROVIDING PACKET ROUTING

[75] Inventors: Avigdor Willenz, Kamoon; David Shemla, Kfar Havradim; Yosi Sholt, Haifa, all of Israel

[73] Assignee: Galileo Technologies Ltd., Karmiel, Israel

[21] Appl. No.: 08/790,149

[22] Filed: Jan. 28, 1997

[30] Foreign Application Priority Data

Jan. 31, 1996 [IL] Israel ......................................... 116986

[51] Int. Cl.$^6$ ................................................. H04L 12/28
[52] U.S. Cl. ............................................ 709/238; 370/401
[58] Field of Search ................................... 370/389, 390, 370/401, 402; 395/200.55, 200.68; 709/225, 238

[56] References Cited

U.S. PATENT DOCUMENTS

| | | | |
|---|---|---|---|
| 5,274,631 | 12/1993 | Bhardwaj ................................ | 370/389 |
| 5,521,913 | 5/1996 | Gridley ................................... | 370/389 |
| 5,632,021 | 5/1997 | Jennings et al. ....................... | 395/309 |
| 5,634,138 | 5/1997 | Ananthan et al. ..................... | 395/841 |
| 5,724,529 | 3/1998 | Smith et al. ............................ | 395/309 |
| 5,761,431 | 6/1998 | Gross et al. ....................... | 395/200.55 |
| 5,764,996 | 6/1998 | Armstrong et al. .................... | 395/733 |
| 5,781,549 | 7/1998 | Dai ........................................ | 370/401 |
| 5,784,373 | 7/1998 | Satake et al. .......................... | 370/402 |

*Primary Examiner*—Zarni Maung
*Assistant Examiner*—Patrice L. Winder
*Attorney, Agent, or Firm*—Darby & Darby

[57] ABSTRACT

A switched Ethernet controller (SEC) device and associated method that provides processor based intervention in the packet routing decision process is provided. The method of routing a multicast packet between a source port on a source device and a plurality of destination ports on a plurality of destination devices, utilizes a processor. The method includes the steps of the source device receiving the multicast packet via the source port, the source device sending the multicast packet to the processor, the processor examining the multicast packet, the processor determining the plurality of destination devices and corresponding the plurality of destination ports based on the results obtained during the step of examining, the processor transferring the multicast packet to the plurality of destination devices, and the plurality of destination devices sending the multicast packet to the plurality of destination ports.

4 Claims, 3 Drawing Sheets

SWITCHING ETHERNET CONTROLLER PROVIDING PACKET ROUTING

FIELD OF THE INVENTION

The present invention relates to switched Ethernet controller devices and more specifically to switched Ethernet controller devices for providing processor based intervention in the packet routing decision process.

BACKGROUND OF THE INVENTION

Traditional Ethernet switching hub equipment operates by examining Ethernet header information to perform local switching functions. If it is determined that a frame is destined for a local port, the hub transfers the frame between the inbound port and the outbound port. Typically this transfer occurs between multiple switching Ethernet controller devices in hardware using a direct memory access transfer scheme, common in many computer designs. The disadvantage of using direct memory transfer to transfer Ethernet frames is that it precludes the provision of any upper OSI level processing such as Level 3 processing or routing. The OSI stack defines seven levels or layers that operate independently of one another. Each level or layer has a distinct task or function to perform. In the OSI model Level 1 is defined as the physical layer, Level 2 as the link layer, and Level 3 as the network level. Traditional Ethernet switching is performed at the Level 2 layer. However, in many situations it is desirable to be able to perform some Level 3 processing also (i.e. by a processing device other than the switching Ethernet controller device), using suitable hardware or software techniques. Using direct memory transfer techniques to transfer the frame from one port to another makes this impossible.

SUMMARY OF THE INVENTION

Accordingly, it is an object of the present invention to provide a switched Ethernet controller device able to intervene in the packet routing decision mechanism.

It is another object of the present invention to provide a switched Ethernet controller device able to intervene in the packet routing decision mechanism for both multicast and unicast packets.

A switched Ethernet controller (SEC) device and associated method that provides processor based intervention in the packet routing decision process is disclosed. A suitably programmed processor in combination with the switched Ethernet controller device enables a user or network designer to exert control over the packet routing decision process. Thus, routing capabilities can be incorporated in a switching hub constructed using SEC devices of the present invention. Processes are disclosed for handling both multicast and unicast packets. For multicast packets, rather than perform conventional lookup operations to determine the destination device and corresponding port number, a method is disclosed whereby the multicast packet, received from a source device, is first sent to the processor. The processor, in turn, examines the Level 3 or network layer routing information in the payload of the Ethernet frame and determines the destination device and corresponding port to transfer the packet to. For unicast packets, a buffer request is first sent to the processor rather than being immediately sent to all ports. The processor, based on an examination of the Level 3 data contained in the payload of the Ethernet frame, either discards the packet, causes the packet to be transferred from the source device to the destination device or requests to receive the packet directly.

Thus, there is provided in accordance with a preferred embodiment of the present invention, a method of routing a multicast packet between a source port on a source device and a plurality of destination ports on a plurality of destination devices, utilizing a processor, the method including the steps of the source device receiving the multicast packet via the source port, the source device sending the multicast packet to the processor, the processor examining the multicast packet, the processor determining the plurality of destination devices and corresponding the plurality of destination ports based on the results obtained during the step of examining, the processor transferring the multicast packet to the plurality of destination devices, and the plurality of destination devices sending the multicast packet to the plurality of destination ports.

In accordance with a preferred embodiment of the present invention, the step of causing the source device to send the unicast packet to the destination device, includes the steps of the processor sending a second buffer request to the destination device, transferring the unicast packet from the source device to the destination device, and the destination device sending the unicast packet to the destination port. In addition, said step of transferring includes transferring the unicast packet utilizing direct memory transfer.

The step of receiving the unicast packet from the source device includes the steps of the processor sending a second buffer request message to the source device, and the source device sending the unicast packet to the processor.

BRIEF DESCRIPTION OF THE DRAWINGS

The invention is herein described, by way of example only, with reference to the accompanying drawings, wherein.

DETAILED DESCRIPTION OF THE INVENTION

Figure 1:
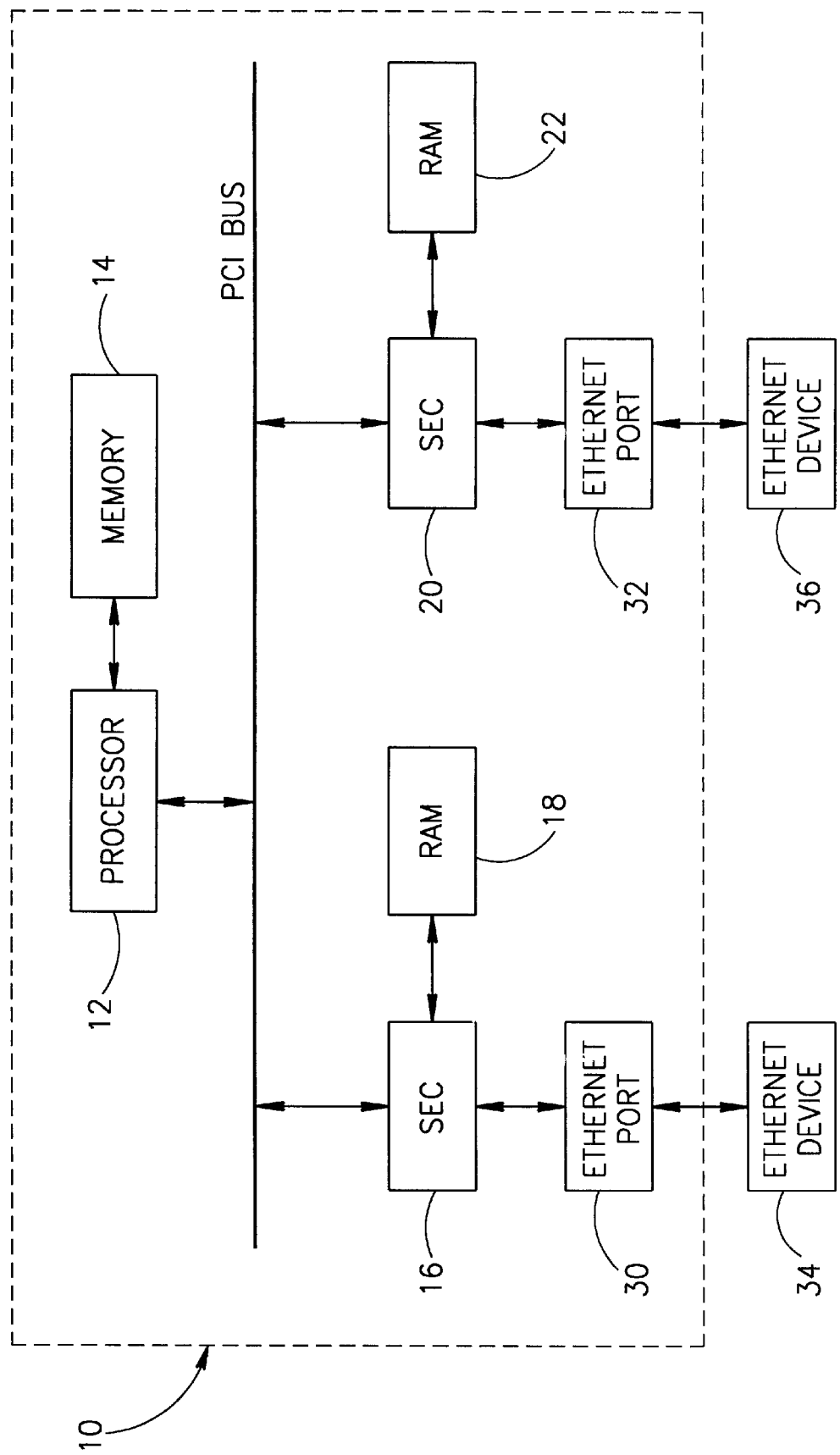
FIG. 1 is a high level block diagram illustrating an example switching hub built using switching Ethernet controller devices constructed in accordance with a preferred embodiment of the present invention.

A high level block diagram of an example switching hub built using switched Ethernet controller devices constructed in accordance with a preferred embodiment of the present invention is illustrated in FIG. 1. The switching hub, generally referenced 10, comprises a processor 12 coupled to memory 14. Processor 12 can be any suitable processor, such as a microprocessor or equivalent. Memory 14 can be any suitable memory device or devices, such as random access memory (RAM), either of the dynamic or static type. In the example illustrated in FIG. 1, processor 12 is coupled to a PCI bus, which is a computer bus well known in the art and commonly used in personal computer (PC) architectures. Switching hub 10 also comprises one or more switching Ethernet controller (SEC) devices. Switching hub 10 can be constructed to include up to any number of SEC devices, thus implementing a switching hub having any number of Ethernet ports. Illustrated in FIG. 1 are two such SEC devices, SEC 16 and SEC 2C. SEC devices 16, 20 function to provide Ethernet switching capabilities between a plurality of Ethernet ports. In the example illustrated in FIG. 1, for the sake of clarity, only one Ethernet port 30 is shown coupled to SEC 16 and only one Ethernet port 32 is shown coupled to SEC 20.

The present invention provides the network with the ability to both transfer data directly between SEC devices and to enable the processor 12 to intervene in the switching operations. Such an intervention is typically software controlled such that the criteria regarding the decisions to be made can be changed overtime.

In a preferred embodiment, each SEC device is coupled to its own memory array. SEC 16 is coupled to RAM 18 and SEC 20 is coupled to RAM 22. External Ethernet devices are coupled to the Ethernet ports on the SEC devices. Ethernet port 30 is coupled to external Ethernet device 34 and Ethernet port 32 is coupled to external Ethernet device 36. Both external Ethernet devices are coupled to their respective Ethernet ports through a wire connecting the two.

Figure 2:
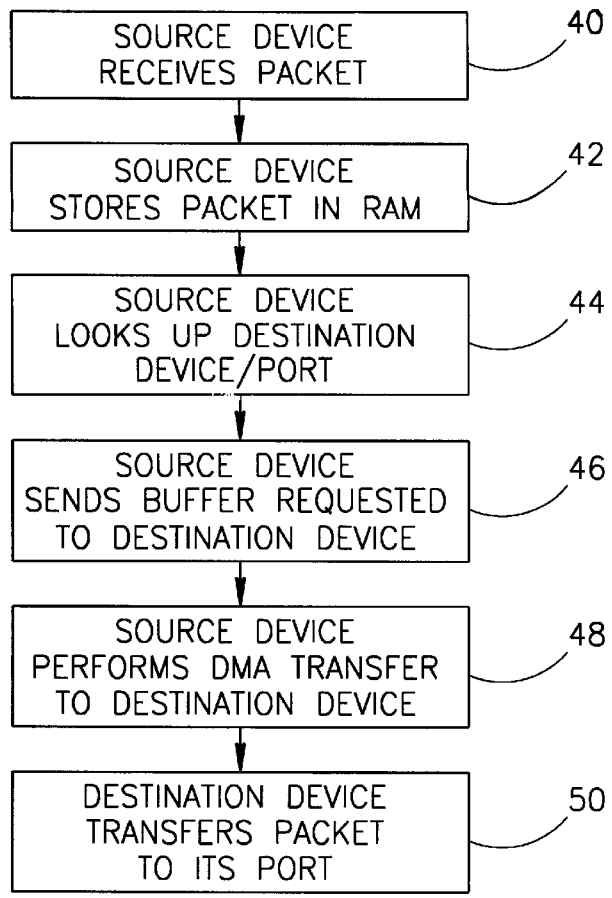
FIG. 2 is a high level flow diagram illustrating the prior art method of routing packets between conventional switching Ethernet controller devices in a switching hub.

The manner of performing Ethernet switching between switches (i.e. non-intervention mode) will now be described, with reference to the high level flow diagram illustrated in FIG. 2. First, a packet is received over the wire from an external Ethernet device, in this example, Ethernet device 34. The packet is received by SEC device 16, designated as the source SEC device, for purposes of this example (step 40). Source SEC 16 stores the packet in RAM 18 (step 42). Source SEC 16 determines the destination SEC device and the appropriate port number within the SEC device to send the packet to (step 44). For the purposes of this example, SEC 20 is designated the destination SEC. Each SEC device maintains an address table within its associated memory with includes, among other things, the 48 bit media access control (MAC) address, device number and port number. Source SEC 16 looks up the destination address included in the received packet. If the destination address is found, source SEC 16 reads the corresponding device and port numbers from the table. As described in more detail in Applicants' co-pending application with Ser. No. 08/790, 151 entitled "A Bus Protocol" and filed on the same day herewith, the SECs transfer data therebetween in accordance with a "write-only" data transfer protocol. Other data transfer protocols are also incorporated into the present invention.

In accordance with the write-only data transfer protocol, once source SEC 16 has determined where to send the data, it first writes a buffer request to destination SEC 20 (i.e. the SEC device found during step 44), requesting that the destination device prepare for a packet transfer (step 46). Destination SEC 20 then allocates a buffer for the packet to be received and writes a start of packet message to source SEC 16 with an indication of the location of the allocated buffer. A direct memory access (DMA) transfer then occurs directly between RAM 18 and RAM 22, thus transferring the packet to the allocated buffer in destination SEC 20 (step 48). Once the DMA transfer is complete, destination SEC 20 outputs the packet to the proper port (step 50). In this example, the packet is transferred between Ethernet port 32 and external Ethernet device 36 over the wire.

As discussed previously, it would be beneficial to network hardware and software application designers if it were possible to control the routing mechanism within a switching hub. Thus, a preferred embodiment of the present invention teaches a hardware/software intervention mechanism. The intervention mechanism allows a user or network designer to exert finer control over the packet routing decision process than is possible with just switch to switch transfers. To achieve an intervention function, processor 12 examines the Level 3 or network layer header information in the payload of the Ethernet frame. The intervention process is different for multicast packets and for unicast packets. The intervention process for multicast packets will be described first.

Figure 3:
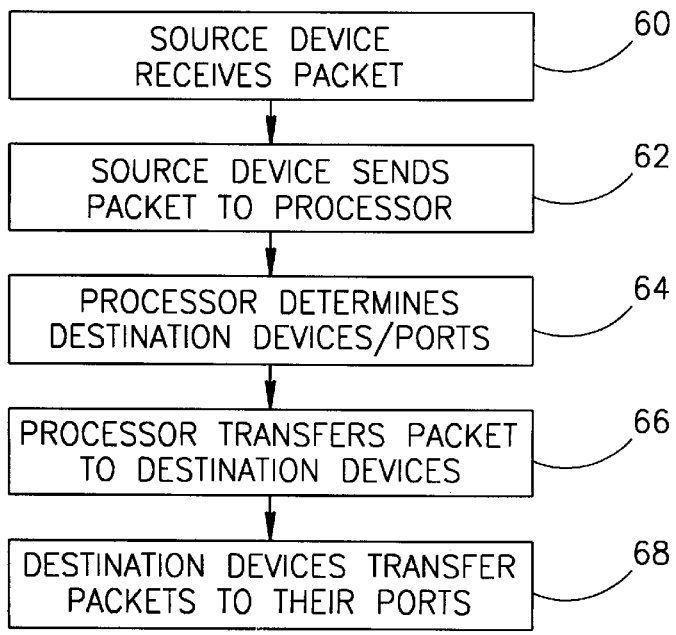
FIG. 3 is a high level flow diagram illustrating a method of intervening in the routing of multicast packets using the switched Ethernet controller device of the present invention.

For multicast packets, a high level flow diagram of the process of intervening in the packet routing decision mechanism is illustrated in FIG. 3. Referring also to FIG. 1, source SEC device 16 first receives a packet over the wire from external Ethernet device 34 via Ethernet port 30 (step 60). Source SEC device 16 then forwards the packet to processor 12 via the PCI bus (step 62), typically via the write only protocol described hereinabove. Processor 12 subsequently decides to what devices and corresponding ports the packet needs to be sent (step 64). The SEC device of the present invention only requires one packet to be sent to it, regardless of the number of destination ports within the SEC the multicast packet is directed to. The SEC device will automatically forward the packet to all the destination ports which processor 12 tagged for that particular multicast packet. Once the destination devices and associated ports are determined, processor 12 forwards the packet to the appropriate destination devices (step 66). The destination SEC devices then forward the packet to the destination ports within their respective device (step 68).

Figure 4:
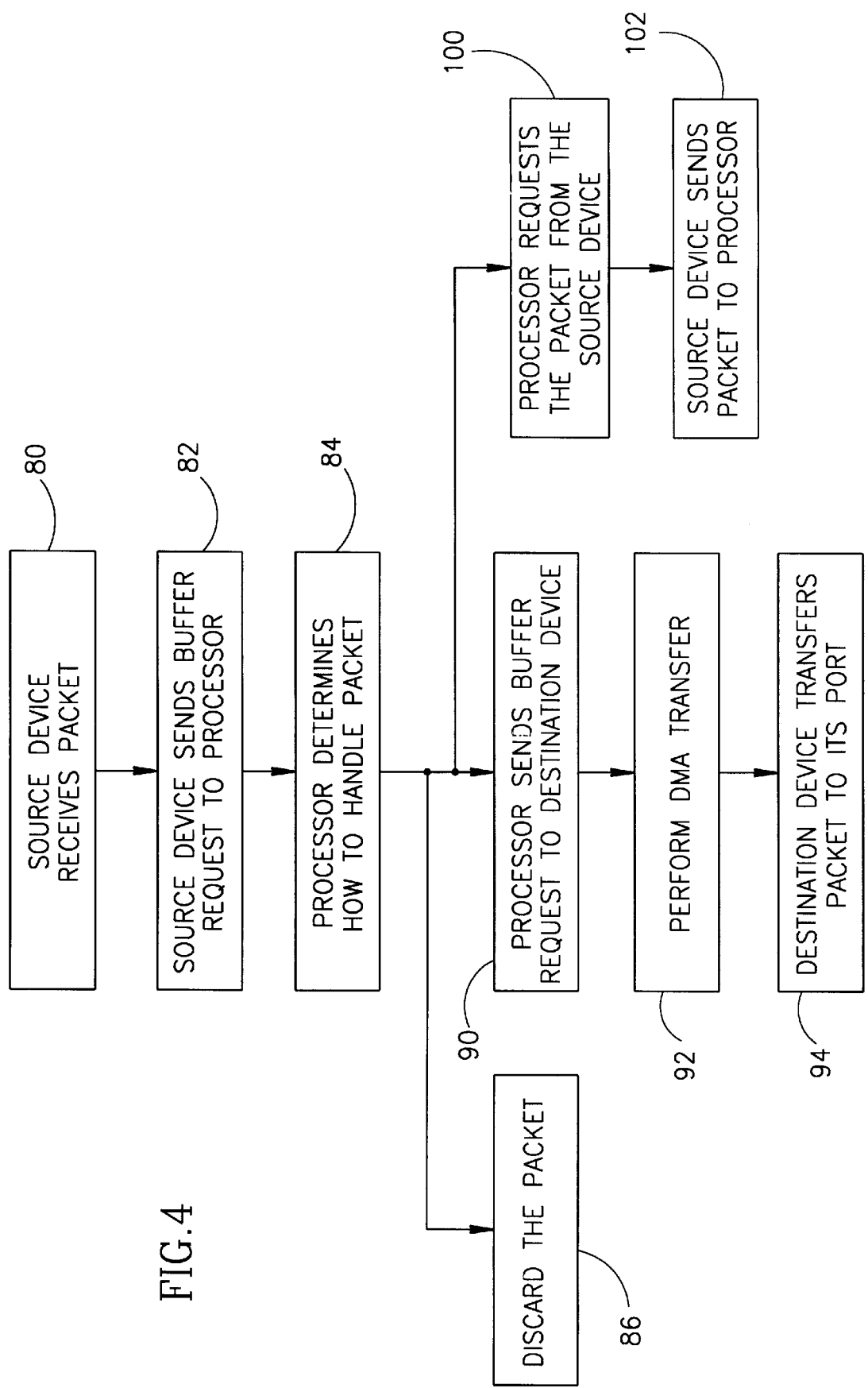
FIG. 4 is a high level flow diagram illustrating a method of intervening in the routing of unicast packets using the switched Ethernet controller device of the present invention.

For unicast packets, a high level flow diagram of the process of intervening in the packet routing decision mechanism is illustrated in FIG. 4. Referring also to FIG. 1, source SEC device 16 first receives a packet over the wire from external Ethernet device 34 via Ethernet port 30 (step 80). Rather than send the packet to the destination device, source device 16 sends a buffer request to processor 12 (step 82). Included in the buffer request is data that processor 12 needs to make a decision as to how to direct the received packet, such as the source port, the destination device and port and the byte count. Based on the information received in the buffer request, processor makes a decision as to how to handle the packet (step 84). In a preferred embodiment, processor 12 chooses one of the following three actions: discard the packet (step 86); send the packet to a destination device (steps 90 to 94); or request to receive the entire packet itself (steps 100 to 102).

To discard a packet (step 86), processor 12 sends a start of packet message to the source SEC device 16 with the byte count field set to zero. If processor 12 decides to forward the packet to a destination device, it first sends a buffer request to destination SEC 20 device (step 90). In response to the buffer request, destination SEC device 20 allocates buffer space and sends a start of packet message to source SEC device 16. Source SEC device 16 performs a DMA transfer of the packet to destination SEC 20 (step 92). When the DMA transfer is complete, source SEC 16 sends an end of packet message to destination SEC 20. Subsequently, destination SEC 20 transfers the packet to the appropriate port (step 94).

If processor 12 decides to request the packet, it first sends a buffer request message to source SEC 16 with the target device, within the buffer request message, set to correspond to the processor itself (step 100). Source SEC 16 then sends the packet to processor 12 followed by an end of packet message (step 102).

Thus, for both multicast and unicast packets, the SEC provides a mechanism, for a device other than itself (i.e.

processor 12), to intervene in and play a role in the packet routing process. Processor 12 can be suitably programmed by the user to tailor the decision process to a set of particular user defined requirements.

While the invention has been described with respect to a limited number of embodiments, it will be appreciated that many variations, modifications and other applications of the invention may be made.

We claim:

1. A method of routing a unicast packet between a source port on a source device and a destination port on a destination device, utilizing a processor, the method comprising the steps of:
 a. receiving said unicast packet via said source port;
 b. sending a first buffer request from said source device to said processor;
 c. examining said buffer request; and
 d. selecting to perform one of the following steps based on the results obtained during said step of examining:
  i. causing said unicast packet to be discarded,
  ii. causing said source device to send said unicast packet to said destination device, or
  iii. receiving said unicast packet from said source device.

2. The method according to claim 1, wherein said step of causing said source device to send said unicast packet to said destination device, comprises the steps of:
 a. sending a second buffer request from said processor to said destination device;
 b. transferring said unicast packet from said source device to said destination device; and
 c. sending said unicast packet from said destination device to said destination port.

3. The method according to claim 2, wherein said step of transferring includes transferring said unicast packet utilizing direct memory transfer.

4. The method according to claim 1, wherein said step of receiving said unicast packet from said source device comprises the steps of:
 a. sending a second buffer request message from said processor to said device; and
 b. sending said unicast packet from said source device to said processor.

* * * * *